May 6, 1969
W. E. BELLER ET AL
3,443,163
MOISTURE SENSING CONTROL USING SWITCHING
TRANSISTOR FOR VOLTAGE REGULATION
Filed Feb. 21, 1967
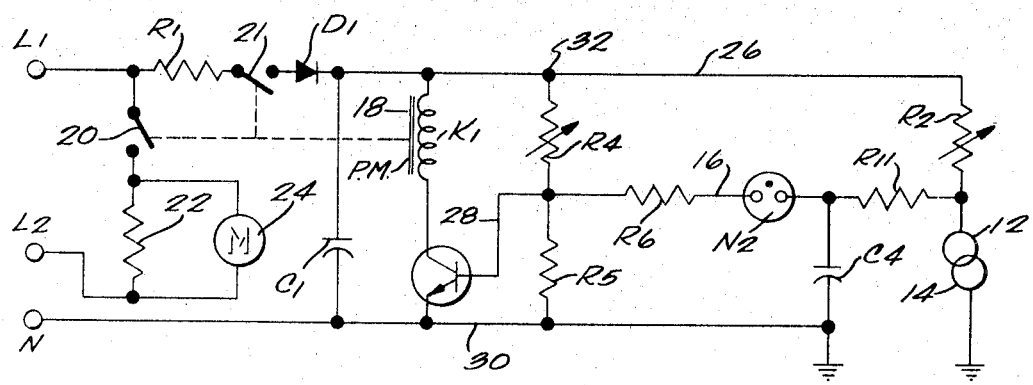
Inventors
Wilbert E. Beller
Abed G. Kahale
By Bayard H. Michael
Attorney

United States Patent Office

3,443,163
Patented May 6, 1969

---

3,443,163
MOISTURE SENSING CONTROL USING SWITCHING TRANSISTOR FOR VOLTAGE REGULATION
Wilbert E. Beller, Park Ridge, and Abed G. Kahale, Roselle, Ill., assignors to Controls Company of America, Melrose Park, Ill., a corporation of Delaware
Filed Feb. 21, 1967, Ser. No. 617,696
Int. Cl. H01h 47/32
U.S. Cl. 317—148.5                  4 Claims

---

ABSTRACT OF THE DISCLOSURE

The moisture sensing control for clothes dryers charges a capacitor as moisture level decreases (resistance of leakage path increases) until neon bulb fires to pulse the base of a switching transistor to pass enough voltage through a coil in the collector circuit to cause a magnetic latch to open and shut down the dryer. A voltage network forward biases the transistor to pass a small amount of current through the coil—less than required to open the latch—which varies with variation of supply voltage to thereby function as a voltage regulator.

---

The magnetic latch concept is claimed in our application Ser. No. 617,630, filed Feb. 21, 1967.

Background of invention

Moisture sensing controls of this general type are in commercial use and are disclosed in Willcox application Ser. No. 383,542 and Behrens application Ser. No. 45,329, filed July 26, 1960. Without some form of voltage regulation the accuracy of the sensing is adversely affected by supply voltage variation. This problem has in the past been generally ignored since the provision of voltage regulation was not considered economically justified.

Summary of invention

Switching transistors have been used in moisture sensing controls but in this circuit a novel magnetic latch arrangement is used so the current passed by the transistor on receipt of the control signal is passed through a coil to generate an electromagnetic field opposing the permanent magnet to initiate shutdown of the dryer. With the simple addition of a resistor to divide the supply voltage the transistor can be forward biased at a level well below the unlatching voltage of the coil. Now as the supply voltage increases (decreases) the coil voltage increases (decreases) to maintain a constant voltage supply to the sensing portion of the control. Therefore, for the very low cost of a resistor the transistor is made to regulate voltage as well as its primary function of switching. Accuracy of the moisture sensing control is improved.

Description of drawing

The single figure shows a simplified wiring diagram which is not intended to show a complete control circuit but highlights the features of this invention.

Description of preferred embodiment

Line voltage applied between $L_1$ and N is rectified by diode $D_1$ and filtered by resistor $R_1$ and capacitor $C_1$ and this DC supply is passed through a variable resistance $R_2$ (value of which determines the moisture level sensed) and applied to a ring 12 in the dryer. As known in this art, the voltage on ring 12 will leak to grounded ring 14 at a rate determined by the moisture content of the dryer contents—that is, by the effective resistance offered by the contents. The voltage on ring 12 charges capacitor $C_4$ through resistor $R_{11}$, the values of $C_4$ and $R_{11}$ being selected to give a suitable time delay on the charging of $C_4$ to allow for clothes not bridging the rings for a period of time. As the charge builds up on capacitor $C_4$ the potential across neon bulb $N_2$ increases. Lead 16 connected to the other side of $N_2$ is connected to the base of transistor $Q_1$ through resistor $R_6$.

Coil $K_1$ is connected between the DC supply and the collector of the transistor while the emitter is connected to lead 30. When tube $N_2$ fires, the transistor conducts and the current flowing through coil $K_1$ will set up a magnetic field opposing the field of permanent magnet 18. The permanent magnet is used to hold switch 20 closed by attracting a ferrous keeper. When the coil is energized by the transistor, the magnetic fields cancel and a return spring acting on the keeper will open the switch. The switch controls energization of the heater 22 and motor 24 connected across $L_1$, $L_2$. This magnetic latch arrangement is claimed in the aforesaid application. The latch also controls switch 21 which, when opened, de-energizes the control.

A small voltage through the coin $K_1$ will not unlatch the switch. With this in mind, a resistor $R_4$ is connected between leads 26 and 28. Resistor $R_5$ is connected between lead 28 and grounded lead 30 which connects to N. Resistors $R_4$ and $R_5$ are connected to act as a voltage divider to bias the transistor forward slightly so a small current flows through $K_1$ at normal line voltage. If line voltage increases, the bias increases to increase the current through the coil (still not enough to unlatch switch 20) and increases the current through resistor $R_1$ which increases the voltage drop across $R_1$. This, then, maintains the voltage applied to the ring 12 near a constant value. If the supply voltage drops, the opposite occurs to again maintain the voltage on ring 12 nearly constant.

The voltage regulation features is obtained in this circuit with only the added cost of resistor $R_4$—all other elements being necessary for operation without the voltage regulation. The transistor serves two functions—switching and regulation. The accuracy of the sensing circuit is increased.

We claim:
1. A moisture sensing control for clothes dryers and the like comprising
    an electric circuit for impressing a DC voltage on a control element from which the voltage can leak at a rate dependent upon the moisture level of the clothes which contact the element from time to time,
    a capacitor charged through a resistor at a rate dependent upon the time constant and the voltage supply to the element,
    switch means responsive to a predetermined charge on the capacitor to pass a control signal,
    a transistor having its base connected to the switch means and responsive to the signal to pass a given current in the collector-emitter circuit,
    means in the collector-emitter circuit responsive to the given current to initiate termination of drying,
    the improvement comprising the addition of a voltage divider network in the circuit to apply a bias on the base of the transistor causing current flow in the collector-emitter circuit below the given current but sufficient to regulate the voltage applied to the control element at a nearly constant value.

2. A control according to claim 1 in which the supply circuit includes a resistor through which current flow and voltage drop increase when the voltage divider network increases the bias on the base of the transistor as the line voltage increases.

3. A control according to claim 1 in which the means in the collector-emitter circuit includes a coil having a magnetic field and a permanent magnet having an opposing magnetic field.

4. A control circuit having a DC supply circuit,
condition responsive means supplied by the circuit and operative in response to a condition to pass a control signal,
a transistor having its base connected to receive the control signal and having its collector-emitter circuit connected across the supply circuit,
a control device in the collector-emitter circuit and responsive to the current therein as a result of the application of the control signal to said base to effect a control function,
a voltage divider network in the supply circuit connected to bias the transistor forward to cause current in the collector-emitter circuit which is a function of the supply voltage and is in all cases below the current to which the control device responds,
and a voltage dropping resistor in the supply circuit affected by the current in the collector-emitter circuit to increase or decrease the voltage drop as the collector-emitter current increases or decreases with increasing or decreasing voltage supply to thereby maintain the voltage supplied to the condition responsive means nearly constant.

References Cited

UNITED STATES PATENTS

| 2,475,613 | 7/1949 | Hastings | 323—16 |
| 3,227,942 | 1/1966 | Bunch | 323—22 |
| 3,266,166 | 8/1966 | Finnegan | 317—148.5 |
| 3,394,466 | 7/1968 | Heidtmann | 34—45 |

LEE T. HIX, *Primary Examiner.*

D. HARNISH, *Assistant Examiner.*

U.S. Cl. X.R.

34—45; 307—118